Sept. 22, 1931.   W. G. HASLEY   1,824,205
MOTOR VEHICLE SUSPENSION
Filed Nov. 29, 1929
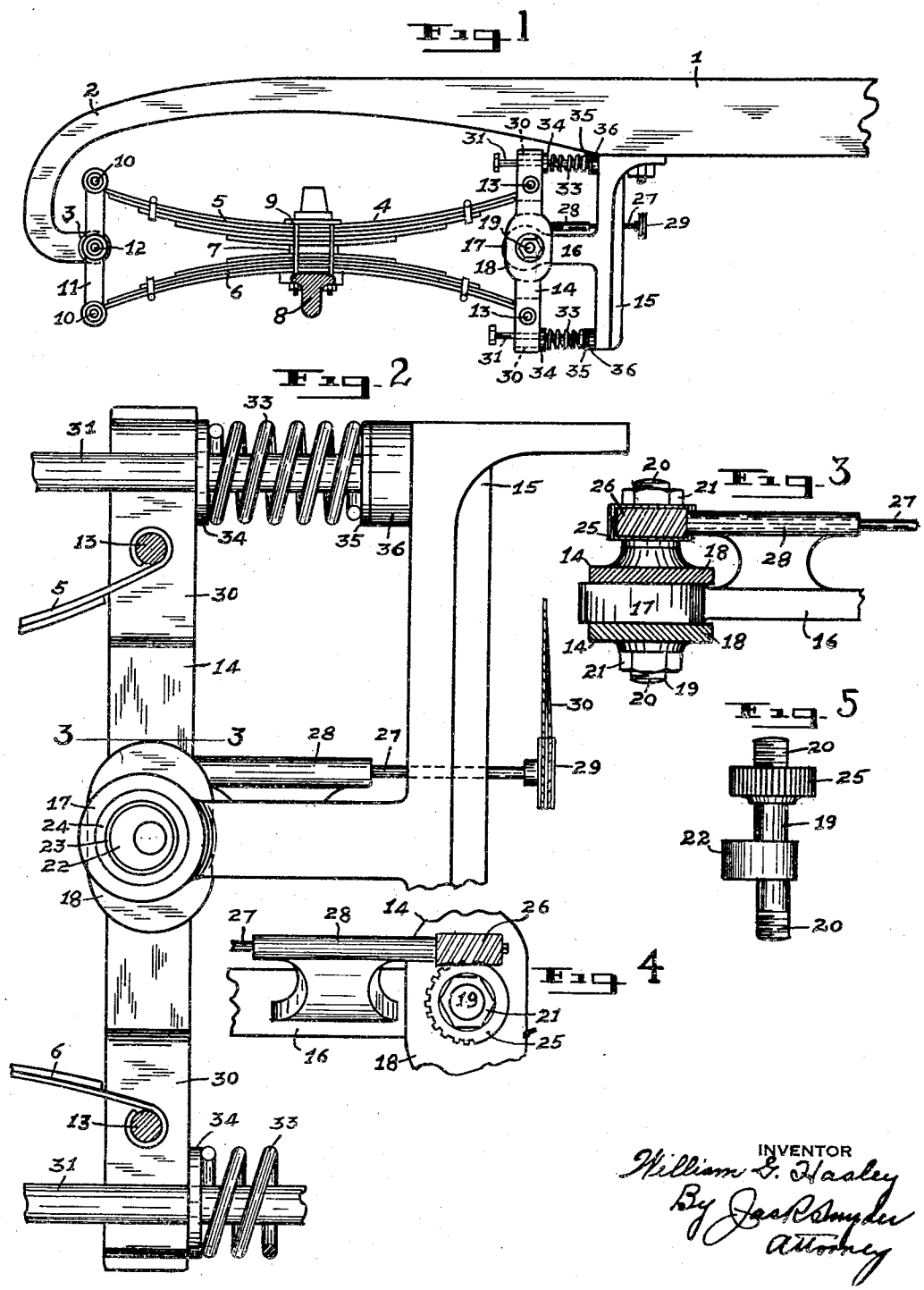

Patented Sept. 22, 1931

1,824,205

UNITED STATES PATENT OFFICE

WILLIAM G. HASLEY, OF PITTSBURGH, PENNSYLVANIA, ASSIGNOR OF ONE-THIRD TO JOHN H. DOWNES, OF PITTSBURGH, PENNSYLVANIA

MOTOR VEHICLE SUSPENSION

Application filed November 29, 1929. Serial No. 410,331.

My invention relates to certain new and useful improvements in the spring suspensions for a motor vehicle, for minimizing shocks and jars to the latter, and to effectively neutralize the throw of the vehicle body under the influence of road inequalities.

Important objects of the invention are to provide a spring suspension of the character described, which will operate efficiently to resist the abnormal throw of the vehicle body under adverse road conditions, without liability of breaking the suspension mechanism or rocking the vehicle, and which permits of the variable movements of the vehicle body without cramping or binding the working parts of said mechanism.

Other objects are to provide a suspension of the class stated, which not only prevents shocks, due to rough roads, but produces a steadying effect when the vehicle is traveling upon ordinary roads or paved streets, eliminating the minor jolts and preventing the cumulative effects of small bumps by controlling all movements of the vehicle body to and from the chassis; and whereby a maximum cushioning effect is obtained and undue depressions and rebounds are effectively checked, with little or none of the objectionable shocks frequently attending the use of suspensions now in general use.

Further objects of the invention are to provide a device of the type set forth, which will prevent shimmying of the motor vehicle front wheels, which will eliminate the need of shock absorbers, and snubbing apparatus, which is adjustable to function relatively to the load carried thereby, which may be installed in motor vehicles already constructed as well as form a component part of a new motor vehicle structure, which will maintain the motor vehicle axles in their exact transverse alignment, which is simple in its construction and arrangement, strong, durable and efficient in its use, compact, noiseless, attractive in appearance, positive in its action, and comparatively inexpensive to manufacture and install.

To the accomplishment of these and such other objects as may hereinafter appear, the invention consists of the novel construction, combination and arrangement of parts herein specifically described, and illustrated in the accompanying drawings wherein is shown an embodiment of the invention, but it is to be understood that variations in the form, proportions and details of construction may be resorted to, without departing from the spirit of sacrificing any of the advantages of the invention, as defined in the claims hereunto appended.

In the drawings wherein like numerals of reference designate corresponding parts throughout the several views:—

Figure 1 is a fragmentary side view of the front end of a motor vehicle frame provided with a spring suspension constructed in accordance with the invention.

Figure 2 is an enlarged detail view of suspension elements embodied in the present invention.

Figure 3 is a view on line 3—3, Figure 2.

Figure 4 is a fragmentary inner side view of the adjusting device for the suspension elements.

Figure 5 is a top plan view of the cam member and of associated parts.

Referring in detail to the drawings, 1 denotes the frame of a motor vehicle chassis. The frame 1 is of the usual construction, being formed from channel structural iron and having a reduced forward end portion 2, which has its forward end formed to provide a depending, rearwardly disposed bearing 3.

The motor vehicle spring 4, consists of a pair of associated semi-elliptical leaf spring sections, respectively indicated at 5 and 6. While the construction and arrangement of but one front spring 4, is herein illustrated and described, it is, of course, obvious that all four springs of a motor vehicle are identical in construction and arrangement, except that the suspension elements, carrying the front springs, are positioned reversely relatively to the suspension elements carrying the rear springs.

The spring sections 5 and 6 extend horizontally in opposite directions with respect to each other, the spring section 5 being disposed above the spring section 6 and having its ends projecting upwardly, while the spring section 6 has its ends projecting downwardly. By this arrangement, the convex sides of the spring sections 5 and 6 are disposed adjacent to each other, and are spaced from and seated to each other by a centrally interposed spacing block 7. The spring sections 5 and 6 are rigidly clamped together, centrally of their lengths, and to the top of the front axle 8 of the motor vehicle, by a clamping element 9, of any suitable construction.

The forward ends of the associated spring sections 5 and 6 are pivotally joined, as at 10, between respective ends of a pair of parallel and vertically disposed front shackle links 11. The latter are supported and journaled centrally of their lengths, as at 12, in the bearing 3. It will be evident, that a motor vehicle frame that is not formed to provide such bearing 3, may readily be provided with a suitable suspension bracket for connecting with the front shackle link 11 in the manner stated.

The rearward ends of the spring sections 5 and 6 are pivotally connected, by the bolts 13, between a pair of parallel and vertically disposed, adjustable shackle bars 14. The latter are supported by a suspension bracket 15 at the forward end of a forwardly projecting, horizontally disposed, arm 16. The bracket 15 is fixed to and depends perpendicularly from the frame 1, and the arm 16 is formed integral therewith centrally of its length.

The forward end of the bracket arm 16 is formed to provide a bearing 17 and is pivotally connected between the recessed and enlarged central portions 18 of the associated shackle bars 14. The connection of the bearing 17 with the shackle bars 14 constitutes a feature of the present invention, and is such that the pivotal connection of the shackle bars 14 may be shifted to elevate and lower the pivotal connection of the latter, thereby permitting of the adjustment of the shackle bar connection to best adapt same to the load to be carried thereby.

The bearing 17 is pivotally joined to and between the shackle bars 14 by a cam bolt 19 having threaded ends 20 for the engagement of the securing nuts 21. A circular cam member 22 is preferably formed integral with the bolt 19 and is positioned eccentrically on the latter, as clearly shown in Figures 2 and 5. The cam member 22 operates in and is surrounded by a bushing 23, which may be constructed from brass or any other suitable metal. A rubber annulus 24 surrounds the bushing 23 and together with the latter is fixedly set in and virtually constitutes a part of the bearing 17.

In the operation of the device, the cam member 22 operates in the bushing 23, and the rubber annulus 24 is consequently not subjected to wear, and is only provided to render a noiseless operation at this connection.

A segment worm gear wheel 25 is fixed on the cam bolt 19 adjacent to the inner end of the latter. The worm gear wheel 25 is in mesh with and driven by a worm 26, which is fixed on the outer end of a shaft 27. The latter is suitably journaled for rotation in a bearing 28 carried by the bracket arm 16. The inner end of the worm shaft 27 is provided with a double grooved sheave 29 adapted for engagement by a cable 30. The latter preferably leads to the interior of the motor vehicle and connects with any suitable mechanism permitting the remote adjustment of the connection of the shackle bars 14 with the bearing 17.

As shown in Figure 4, only one-half of the gear wheel 25 need be provided with gear teeth. The relative positions of the cam member 22 and gear wheel 25 is such that when the cam member 22 is in the neutral position or extending forwardly, as shown in Figure 2, the gear teeth will be disposed to extend along the upper periphery of the gear wheel 25. For adjusting the device for greater loads, the cam member 22 is shifted to dispose same downwardly in the bearing 17 by rotating the worm gear wheel 25 in the proper direction a distance permitted by its segmental gear teeth. This adjustment will shorten the distance between the center of the cam bolt 19 and the center of the upper spring section bolt 13. For lesser loads the cam member 22 is shifted to dispose the same upwardly to lengthen the distance between the center of the cam bolt 19 and the center of the upper spring section bolt 13.

The necessitated lateral displacement of the shackle bars 14 when adjusting the cam member 22 from its neutral position, in the manner stated, is readily permitted and compensated for by the resiliency of the spring sections 5 and 6. Further, the engagement of the worm 26 in the worm gear wheel 25, will securely hold the cam member 22 in its adjusted position, regardless of whether such adjustment is to its full capacity or to any point intermediate of its limits of adjustment.

A guide rod 31 is fixed at each end of the bracket 15, and extends horizontally forward through the recesses 32 formed at respective ends in the combinedly associated shackle bars 14. A spiral spring 33 is mounted on each of the guide rods 31 intermediate of the shackle bars 14 and the bracket 15. The ends of each of the springs 33 abuts against respective washers, indicated at 34 and 35. A rubber cushioning collar 36 is mounted on each guide rod 31 between the washer 35 and the bracket 15. The purpose of the cushioning collars 36 is to assure the silent operation of the springs 33 when the latter are actuated by the reciprocation of the shackle bars 14 during the operation of the device.

The action of the spiral springs 33 exerts a steadying effect stabilizing the operation of the whole suspension apparatus.

The connection of the spring 4 with the shackle links 11 and the shackle bars 14, in the manner stated provides an operation permitting such freedom of action that no straining, pulling or jerking is ever imparted to the motor vehicle front axle equipped therewith, but the latter is maintained thereby in its proper transverse alignment, and in consequence all tendency of wheel shimmying is entirely eliminated.

The present invention provides a most efficient device of its kind, which will effectively absorb all shocks, depressions, rebounds, recoils and all untoward movements, ordinarily attending the operation of a motor vehicle, without the use of any special shock absorbing and snubbing mechanisms, now commonly employed for such purposes.

What I claim is:

1. In a motor vehicle suspension apparatus of the character described consisting of a pair of semi-elliptical spring sections adapted for being secured to the motor vehicle axle, said pair of spring sections having their convex sides disposed toward each other, a shackle member pivotally connecting the outer ends of said pair of spring sections, means for pivotally joining said shackle member centrally of its length with the motor vehicle frame, a shackle element pivotally connecting the inner ends of said pair of spring sections, means for pivotally joining said shackle element with the motor vehicle frame, and means for adjusting the pivotal connection of said shackle element with said last mentioned means.

2. In combination, a motor vehicle suspension apparatus of the character described, comprising a pair of associated semi-elliptical spring sections adapted for being secured in superposed relation to the motor vehicle axle, said pair of spring sections having their convex sides disposed toward each other, a shackle member pivotally connecting the outer ends of said pair of spring sections, means for pivotally joining said shackle member with the motor frame, a shackle element pivotally connecting the inner ends of said pair of spring sections, a bracket secured to the motor vehicle frame and including an outwardly projecting arm, said shackle element having a pivotal connection with the outer end of said arm, and means for adjusting the pivotal connection of said shackle element with said arm.

3. In combination, a motor vehicle suspension apparatus of the character described comprising a pair of associated semi-elliptical spring sections adapted for being secured in superposed relation to the motor vehicle axle, said pair of spring sections having their convex sides disposed toward each other, a shackle member pivotally connecting the outer ends of said pair of spring sections, means for pivotally joining said shackle member with the motor frame, a shackle element pivotally connecting the inner ends of said pair of spring sections, a bracket secured to the motor vehicle frame and including an outwardly projecting arm, said shackle element having a pivotal connection with the outer end of said arm, and means for adjusting said last mentioned pivotal connection and operable from a point remote from the latter.

4. In combination, a motor vehicle suspension apparatus of the character described comprising a pair of associated semi-elliptical spring sections adapted for being secured in superposed relation to the motor vehicle axle, said pair of spring sections having their convex sides disposed toward each other, a shackle member pivotally connecting the outer ends of said pair of spring sections, means for pivotally joining said shackle member with the motor frame, a shackle element pivotally connecting the inner ends of said pair of spring sections, a bracket secured to the motor vehicle frame and including an outwardly projecting arm, said shackle element having a pivotal connection with the outer end of said arm, and a cushioning element embodied in said pivotal connection for silencing the operation of the latter.

5. In combination, a motor vehicle suspension apparatus of the character described, comprising a pair of associated semi-elliptical spring sections adapted for being secured in superposed relation to the motor vehicle axle, said pair of spring sections having their convex sides disposed toward each other, a shackle member pivotally connecting the outer ends of said pair of spring sections, means for pivotally joining said shackle member with the motor frame, a shackle element pivotally connecting the inner ends of said pair of spring sections, a bracket secured to the motor vehicle frame and including an outwardly projecting arm, said shackle element having a pivotal connection with the outer end of said arm, means for adjusting the pivotal connection of said shackle element with said arm, and a cushioning element embodied in said pivotal connection for silencing the operation of the latter.

6. In combination, a motor vehicle suspension apparatus of the character described comprising a pair of associated semi-elliptical spring sections adapted for being secured in superposed relation to the motor vehicle axle, said pair of spring sections having their convex sides disposed toward each other, a shackle member pivotally connecting the outer ends of said pair of spring sections, means for pivotally joining said shackle member with the motor frame, a shackle element pivotally connecting the inner ends of said pair of spring sections, a bracket secured to the motor vehicle frame and including an outwardly projecting arm, said shackle element having a pivotal connection with the outer end of said arm, means for adjusting the pivotal connection of said shackle element with said arm, a cushioning element embodied in said pivotal connection for silencing the operation of the latter, and a pair of resilient members disposed between and engaging respective ends of said shackle element and said bracket.

7. In combination, a motor vehicle suspension apparatus of the character described comprising a pair of associated horizontally disposed semi-elliptical spring sections adapted for being secured in superposed relation to the motor vehicle axle, said pair of spring sections having their convex sides disposed toward each other, a shackle member pivotally connecting the outer ends of said pair of spring sections, means for pivotally connecting the center of shackle member with the motor vehicle frame, a shackle element pivotally connecting the inner ends of said pair of spring sections, a bracket secured to the motor frame and including an outwardly projecting arm, said shackle element having a pivotal connection with the outer end of said arm, means for shiftably adjusting said last mentioned pivotal connection and operable from a point remote from the latter, a cushioning element embodied in said adjustable connection for silencing the operation of the latter, a pair of spiral springs disposed between and engaging respective ends of said shackle element and said bracket, and a rubber cushioning member mounted between the inner ends of each of said spiral springs and said bracket, substantially as described.

In testimony whereof I affix my signature.

WILLIAM G. HASLEY.